2,790,749

N - TRICHLOROMETHYLTHIO-4,5-DIMETHYL-TETRAHYDROPHTHALIMIDE AND FUNGICIDAL COMPOSITION CONTAINING SAME

Gerrit Johan Meine van der Kerk, Utrecht, Netherlands, assignor to Nederlandse Centrale Organisatie voor Toegepast-Natuurwetenschappelijk Onderzoek, 's-Gravenhage, Netherlands, a corporation of the Netherlands No Drawing. Application December 3, 1953,
Serial No. 396,051

Claims priority, application Netherlands
December 5, 1952

2 Claims. (Cl. 167—33)

In a recent publication (Science 115, 84 (1952)) a new group of valuable compounds with fungicidal properties is disclosed which compounds are obtained by reacting perchloromethylmercaptan ClS-CCl₃ with the alkali salts of organic imides and amides.

The N-trichloromethylthio derivatives of imides of dicarboxylic acid, hydantoins, oxazolidine 2,4-diones and sulphonamides are mentioned as the representatives of this new group of compounds and from this group the N-trichloromethylthiotetrahydrophthalimide is appreciated to be the most valuable compound for combating plant diseases in practice. Also in the laboratory test on the fungicidal activity, this compound has proved to be the most active one among all representatives of this new class of compounds which have so far been mentioned in literature.

In the U. S. patent specification No. 2,553,770 the production of compounds being bactericides, fungicides and insecticides is described, comprising the production of several new compounds such as the N-trichloromethylthioimide of a dicarboxylic acid, N-trichloromethyl thiotetrahydrophthalimide and its chlorinated derivatives, N-trichloromethylthiophthalimide, N-trichloromethylthiosuccinide, N-trichloromethylthioendomethylenetetrahydrophthalimide, N-thiotrichloromethyl 5,5-dimethyloxazolidine 2,4-dione, N-thiotrichloromethyl 5-methyl 5-ethyloxazolidine 2,4-dione etc., having a fungicidal inhibitive activity in concentrations of about 10–1 mg./litre.

I have now found that the dimethyl derivative of the N-trichloromethylthiotetrahydrophthalimide, viz. the N-trichloromethylthio 4,5-dimethyltetrahydrophthalimide

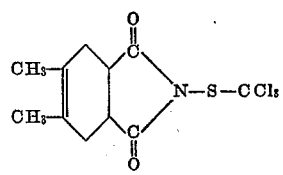

which has so far neither been prepared nor known, has very outstanding properties as compared with its related compounds and exceeds the compounds mentioned in fungicidal activity to a very high degree.

The following table shows the results of tests which prove the exceptional activity of my new dimethyl derivative against parasitical fungi compared with the activity of the known N-trichloromethylthiotetrahydrophthalimide.

|  | growth-preventing concentration in mg. per litre | | |
|---|---|---|---|
|  | B. cinerea | P. italicum | A. niger |
| N-trichloromethylthiotetrahydrophthalimide | 1 | 0.5 | 1 |
| N-trichloromethylthio-4,5-dimethyltetrahydrophthalimide | 0.05 | 0.05 | 0.5 |

From this it follows that though others made the fundamentally important investigation that compounds built up from perchloromethylmercaptan and organic imides and amides give valuable agents for combating plant diseases caused by moulds, they did not find the compounds with optimal activity against plant diseases. In this respect the N-trichloromethylthio 4,5-dimethyltetrahydrophthalimide having a much greater activity than the known non-methylated products is of fundamental importance in the art. In no way was it to be foreseen that this would be the case nor could it be derived from what has so far become known about the group of trichloromethylthio derivatives.

With respect to the most favorable representatives of this group of compounds known so far the compound according to my invention has moreover great advantages of a technical nature. The technically most difficult stage in the preparation of N-trichloromethylthiotetrahydrophthalimide is the preparation of the tetrahydrophthalic anhydride, which is subsequently converted by means of ammonia and perchloromethylmercaptan successively into the desired compound. Tetrahydrophthalic anhydride is obtained by a Diels-Alder condensation of buta 1,3-diene and maleic anhydride. Firstly the technical operation with butadiene is difficult on account of its unfavorable boiling point of −5° C. and secondly it can only be produced economically in connection with special fields of application of quite a different nature. The starting material of the compound according to my invention is the 2,3-dimethylbuta 1,3-diene. By conversion with maleic anhydride into the 4,5-dimethyltetrahydrophthalic anhydride and subsequent treatment of the latter compound with ammonia and perchloromethylmercaptan the desired N-trichloromethylthio 4,5-dimethyltetrahydrophthalimide is obtained.

For manufacturing processes of the present type the dimethylbutadiene mentioned has considerable technical advantages over butadiene. In the first place it is much more easily operable because of its more favorable boiling point of 69–70° C. In the second place dimethylbutadiene is easily produced from acetone (via pinacol), namely by means of technically simple processes, the economic operability of which does not depend on a certain minimum amount of the production.

The application of the compound according to my invention as a fungicide takes place in the customary way in the art, e. g. by spraying, nebulizing or dusting the compound if necessary as preparations in a dissolved or suspended state or admixed with a carrier. Other combating agents, adhering or wetting agents may be added to these preparations.

It is certain that in practice a smaller quantity of the compound according to my invention will be required than of the known non-methylated product.

In the following example a way of producing the compound according to my invention is given:

*Example*

Stage (a), the production of 4,5-dimethyltetrahydrophthalic anhydride. To a suspension of 98 g. maleic anhydride (1 mol.) in 500 ml. benzene, 82 g. (1 mol.)

freshly distilled dimethylbutadiene (obtained by catalytic dehydration of pinacol) are added. The temperature of the reaction mixture increases and finally this mixture will boil. This boiling is continued by heating for a few hours under reflux. By distilling of the solvent, the 4,5-dimethyltetrahydrophthalic anhydride is obtained in a practically quantitative yield. If necessary, the product may be recrystallized from ligroin. Melting point 76–77° C.

Stage (b), the production of 4,5-dimethyltetrahydrophthalimidepotassium. 350 cm.³ concentrated ammonia in which the anhydride is dissolved while heating are added to 178 g. (1 mol.) 4,5-dimethyltetrahydrophthalic anhydride. Next, the aqueous ammonia is distilled off, after which the temperature of the residue is raised to 300° C. in the course of two hours. After having been poured out and cooled the mass is recrystallized from methanol. The yield of 4,5-dimethyltetrahydrophthalimide amounts to approx. 85%. The melting point is 125–126° C.

With a quantitative yield the imide is converted into the potassium salt by dissolving it in ethanol, adding the calculated quantity of alcoholic KOH and drying it on a steam bath.

Stage (c), the production of N-trichloromethylthio 4,5-dimethyltetrahydrophthalimide. While stirring continuously, a solution of 186 g. perchloromethylmercaptan in 1 litre benzene is poured drop by drop in a suspension of 215 g. (1 mol) 4,5-dimethyltetrahydrophthalimide potassium in 2 litre benzene. Then this mixture is boiled for 4 hours and the formed KCl is filtered off while the mixture is still in the hot state. After drying the filtrate on a steam bath, the residue is recrystallized from ligroin. The yield amounts 90% of the theory. The melting point is 125° C.

I claim:

1. As a new chemical compound N-trichloromethylthio 4,5-dimethyltetrahydrophthalimide.

2. A fungicidal composition containing N-trichloromethylthio 4,5-dimethyltetrahydrophthalimide as an active ingredient.

References Cited in the file of this patent
UNITED STATES PATENTS

| | | |
|---|---|---|
| 2,262,002 | Hopff et al. | Nov. 11, 1941 |
| 2,553,770 | Kittleson | May 22, 1951 |

OTHER REFERENCES

Newman et al.: Abstract of Application Serial No. 68,042, published Jan. 9, 1951.